United States Patent [19]

Lundberg et al.

[11] 3,974,241

[45] Aug. 10, 1976

[54] BLENDS OF SULFONATED ELASTOMERS WITH CRYSTALLINE POLYOLEFINS

[75] Inventors: Robert D. Lundberg, Somerville; Robert R. Phillips, Spring Lake Heights, both of N.J.; Lowell Westerman, Baytown, Tex.; Jan Bock, Piscataway, N.J.

[73] Assignee: Exxon Research and Engineering Company, Linden, N.J.

[22] Filed: Nov. 18, 1974

[21] Appl. No.: 524,512

[52] U.S. Cl. .................. 260/897 B; 260/23.5 A; 260/28.5 R; 260/876 R; 260/876 B; 260/889
[51] Int. Cl.² .................. C08L 23/16; C08L 23/12; C08L 23/06
[58] Field of Search ............. 260/897 A, 897 B, 889

[56] References Cited
UNITED STATES PATENTS

| | | | |
|---|---|---|---|
| 3,642,728 | 2/1972 | Canter | 260/79.3 R |
| 3,758,643 | 9/1973 | Fisher | 260/897 A |

*Primary Examiner*—Carman J. Seccuro
*Attorney, Agent, or Firm*—R. J. Baran

[57] ABSTRACT

This invention relates to blends of sulfonated elastomers with crystalline polyolefins. The sulfonated elastomer comprises from about 0.2 to about 20 mole percent sulfonate groups, at least 95% of which are combined with metal counter ions selected from the group consisting of Groups I and II of the Periodic Table of the Elements, aluminum, and lead; organic amines; and mixtures thereof. The crystalline polyolefin is preferably selected from the group consisting of polyethylene, including high and low density polyethylenes, and polypropylene. The crystalline polyolefin comprises a minor portion of said blends.

10 Claims, No Drawings

BLENDS OF SULFONATED ELASTOMERS WITH CRYSTALLINE POLYOLEFINS

FIELD OF THE INVENTION

This invention relates to blends of sulfonated elastomers with crystalline polyolefins. The sulfonated elastomer comprises from about 0.2 to about 20 mole percent sulfonate groups, at least 95% of which are combined with metal counter ions selected from the group consisting of Groups I and II of the Periodic Table of the Elements, aluminum, and lead; organic amines; and mixtures thereof. The crystalline polyolefin is preferably selected from the group consisting of polyethylene, including high and low density polyethylenes, and polypropylene. The crystalline polyolefin comprises a minor portion of said blends.

BACKGROUND OF THE PRIOR ART

U.S. Pat. No. 3,642,728 teaches a new class of sulfonated polymers which are derived from polymers containing olefinic unsaturation, especially elastomeric polymers, e.g. butyl and ethylene-propylene terpolymers. These materials may be neutralized with organic amines or basic materials selected from Groups I, II, III, IV, V, VIB, VIIB and VIII and mixtures thereof of the Periodic Table of the Elements. These materials, especially the butyl and the ethylene-propylene terpolymer derivatives, may broadly be classified as thermoelastomers, that is these materials may be processed at high temperatures by use of shear force in the presence of selected polar additives and yet at the temperature of use, e.g. room temperature, the materials, through the association of the sulfonate group behave as cross-linked elastomers. Thus, these materials represent one form of reprocessable elastomers, which are very desirable in industry.

However, although these materials are commercially useful, the melt viscosity even at very high temperature tends to be sufficiently high as to preclude the use of conventional plastic fabrication techniques. Thus, the very purpose for which these compounds are derived is not adequately fulfilled. In this invention, it has unexpectedly been discovered that decreased melt viscosity may be obtained by combining these polymers with a minor portion of a crystalline polyolefin in a polymer blend. Further, it has been unexpectedly discovered that the physical properties of these blends, as measured at room temperature, can be substantially improved as compared to the sulfonated elastomers alone.

The sulfonated elastomers described in U.S. Pat. No. 3,642,728 when used as gums possess a relatively low level of rigidity or stiffness which yields rather limp materials incapable of supporting themselves when prepared in thin sections. This is a major limitation, if one desires to prepare dimensionally stable parts, e.g. automotive or appliance applications. It is known in the art that stiffness of elastomers may be increased by the combination of carbon black or inorganic material such as clays, calcium carbonate or silicates, etc. However, these materials, while increasing the hardness, further deteriorate the melt viscosity of the above-described ionic elastomers. Thus, systems which at best have borderline processability even at very low metal sulfonate levels further deteriorate in their flow behavior and thus cannot be processed at all. It has unexpectedly been discovered that the compositions of the instant invention wherein minor amounts of the crystalline polyolefin are combined with the sulfonated elastomers described above result in increased stiffness at room temperatures.

Thus, this invention teaches compositions of matter which represent significant improvement over the prior art in that low melt viscosity is obtained at no loss in physical properties and, in fact, a gain in physical properties is realized.

SUMMARY OF THE INVENTION

It has been unexpectedly discovered that novel blends comprising a major portion of a sulfonated elastomer having at least 95% of the sulfonated groups thereof combined with counter ions selected from the group consisting of Groups I and II of the Periodic Table of the Elements and aluminum and lead, or an organic amine, and a minor portion of at least partially crystalline polyolefin show unexpectedly improved melt viscosity properties and improved room temperature physical properties (as compared to the sulfonated elastomer) itself. More particularly, the sulfonated elastomer is derived from a nonaromatic elastomeric hydrocarbon polymer which may be selected from the group consisting of polyisobutylene containing small amounts of unsaturation, and ethylene propylene terpolymer (i.e., a terpolymer of ethylene, propylene, and a small amount, e.g., <10 mole percent of a diene monomer). These polymers may be sulfonated by techniques taught in U.S. Pat. No. 3,642,728 herein incorporated by reference and, in general, will contain from about 0.2 to about 20 mole percent sulfonate groups. The sulfonate groups of these polymers are combined with metal counter ions, or an organic amine, as described above, or may be in the acid form, e.g., combined with a hydrogen ion. However, at least 95% of said sulfonate groups are combined with a metal counter ion or an organic amine as described above. Preferably, however, at least 98% of said sulfonate groups are so combined and more preferably 100% are so combined.

The metal counter ions, which are preferred over the organic amines in the compositions of the instant invention, may be combined with the sulfonate groups of the elastomer by reacting a basic material wherein said counter ion is the cation moiety thereof, with the sulfonic acid derivative of the elastomer. Said basic materials include compounds wherein the anion is a stronger base than the sulfonate group, e.g., the hydroxides, alkoxides, alcoholates, amides, hydrides, etc. of the metal counter ions. An expecially preferred class of basic materials are the metal carboxylates such as metal acetates, metal stearates, metal laurates, etc.

Examples of these materials include zinc acetate, zinc laurate, zinc stearate, magnesium stearate, barium stearate, calcium stearate, sodium stearate, potassium stearate.

The sulfonated elastomers which are utilized in making the blends of the instant invention are broadly taught in the above patent. All of these materials are useful in forming the blends described herein. However, the preferred sulfonated material is selected from the group consisting of sulfonated ethylene-propylene terpolymers and sulfonated butyl polymers with the sulfonated ethylene-propylene terpolymers most preferred.

These materials are combined with the crystalline polyolefin which is characterized as a polymer of an alpha-olefin having a number average molecular weight of at least 2,000, preferably at least 4,000 and more preferably at least 20,000. This material comprises substantially an olefin but may also incorporate other monomers, for example, vinyl acetate, fumaric acid, methyl acrylate, ethyl acrylate, acrylic acid, sodium acrylate, methyl methacrylate, ethylmethacrylate, methacrylic acid, sodium methacrylate, etc. The preferred polyolefins are selected from the group consisting of polymers of $C_2$ to $C_4$ alpha-olefins, especially the homopolymers thereof. Most preferably the polyolefins are selected from the group consisting of polyethylene and polypropylene.

Both high and low density polyethylene are within the scope of the instant invention. For example, polyethylenes having a density of from 0.90 to 0.97 are generally included. Polypropylene polymers having intermediate and high densities are the preferred examples of the polypropylene material used in the instant invention. These materials will have a density of from 0.88 to 0.925 grams/cc. The polyethylene or polypropylene then can be combined as copolymers thereof so long as adequate crystallinity is obtained in said combination. Thus, block copolymers wherein polyethylene or polypropylene is present in crystalline form are effective.

All the materials described above are subject to certain crystallinity limitations. For example, materials useful in the blends of the instant invention will have a degree of crystallinity of at least 25%, and most preferably at least 40%. It is theorized that this degree of crystallinity is necessary so that at ambient temperatures the crystalline polymer exists in the crystalline state, and thereby confers high modulus and also high strength properties to the blend, while at elevated temperatures above the crystalline melting point of said polyolefin, the polymer provides a degree of plasticization to the sulfonated elastomer and thereby markedly improves its flow behavior.

In order for the crystalline polyolefin to be sutiable in these blends, a minimum level of crystallinity is required. If the level of crystallinity is too low, then the polyolefin will not confer suitable strength to the resulting blend. Consequently a simple dilution effect will be obtained, and the resulting blend will have diminished physical properties, such as tensile strength.

The minimal level of crystallinity for the polyolefin is 25%. If the crystallinity is higher, say 50%, then this is even more desirable. Polymers with up to 100% crystallinity are acceptable.

For the purposes of this invention, the level of polymer crystallinity can be established by several different techniques which are widely known in the art, such as that obtained with X-ray techniques or employment of the measured densities of polymer blocks.

The following calculation permits the determination of percent crystallinity provided that the densities of the crystalline and amorphous polymer segments are available.

% crystallinity = $(d - d_a)/(d_c - d_a) \times 100\%$
d = density of polymer, as measured
$d_a$ = density of polymer in completely amorphous state
$d_c$ = density of polymer in completely crystalline state
(i.e. as obtained from X-ray unit cell measurements)

Alternatively the percent crystallinity can be determined for a polymer directly by X-ray diffraction. In all cases the crystalline polyolefins of this invention will be sufficiently crystalline to exhibit X-ray diffraction peaks by techniques well known to those skilled in the art.

The polyolefins of the instant invention will have a crystalline melting point in excess of 50°C., preferably above 70°C. The crystalline polyolefin is combined with the above-described sulfonated polymers in a minor amount as based on the sulfonated elastomer. This is desirable to maximize the properties of the sulfonated elastomer by providing that it be present as a continuous phase. Normally this occurs whenever the ionic elastomer is a major component of the blend. However, whenever additives are present, such as fillers and extender oils, the ionic elastomer can be a minor component of the total mixture on a weight basis but still exist as a continuous phase. Thus, in all discussions of the relationship of the polyolefin to sulfonated polymer throughout the specification it is noted that minor and major components relate only to the relationship of the crystalline polyolefin and the sulfonated elastomer. Thus, the instant invention contemplates blends wherein the weight ratio of crystalline polyolefin to the sulfonated elastomer is less than 1.0 and most preferably less than 0.70. It has been observed that beneficial effect of the crystalline polyolefin has been observed at a relatively low level of the above ratio of 0.25 and that a ratio as low as 0.05 still confers said beneficial effect. However, the instant invention does not contemplate blends wherein the ratio is below 0.01, since at this level the effect of the crystalline polyolefin is sufficiently small to be of no practical value.

The blends of the instant invention may be prepared by methods known in the art. For example, solutions of the two materials may be mixed and the solvent evaporated. Alternatively, the materials can be dry mixed on a mill. Other methods known in the art which are suitable for making the above blends include those methods commonly employed in the plastics and elastomer industries for mixing polymer systems. One of the methods is that involving a high shear, high temperature mixing device or Banbury. This method provides excellent polymer blends of the type described in the invention in very short mixing times. A second type of equipment which could be employed is a device known as the Farrel Continuous Mixer. A third approach is that of a twin screw extruder again designed to mix very viscous materials at high temperature. The preferred equipment is the Banbury mixing equipment.

It is noted that the blends of the instant invention comprise a rather small portion of the field of ionic elastomers and nonionic plastic blends. However, the unexpected properties observed in the blends of the instant invention are observed only with the specific narrow combinations described herein. For example, blending the sulfonated elastomer described above with various other plastic materials which are physically similar to the crystalline polyolefins of the instant invention does not yield compositions having good melt viscosity in combination with the room temperature physical properties which is obtained with the instant blends. For example, blends of said sulfonated elastomers with homopolymers or copolymers of aromatics wherein, e.g. styrene, is the major component do not have adequate physical properties.

Blends of the above described sulfonated elastomers with polylactones, e.g., poly ε-caprolactone; sulfonated polystyrene; block copolymers of styrene and t-butylstyrene; and in general any of the polymers which are not crystalline polyolefins or crystalline copolymers thereof, yield either poor melt viscosity or inadequate room temperature physical properties in the products prepared from these blends. For example, the blend of an ethylene-vinylacetate copolymer with about 33 weight percent vinylacetate provides a product with relatively poor physical properties. This copolymer possesses very little crystallinity (<25%) and therefore is not within the scope of this invention. If, however, an ethylene vinylacetate copolymer containing lower levels of vinylacetate, e.g., from 2 to 10% by weight, is utilized, excellent blends can be prepared. The blends which have been described above, as outside the scope of the invention also display pronounced stress whitening upon blending as well as other indications of gross incompatability.

It is well known in polymer science that different polymers when blended together, tend to phase separate rather than coexist as a homogeneous polymer blend. This incompatibility can be a major limitation for polymer blends and has precluded the use of such materials in many practical applications. The evidence for such incompatibility is manifested in many ways, such as poor physical properties, opacity of such blends even when comprised of two transparent polymers, pronounced stress whitening under stress, and undesirable processing characteristics.

It is emphasized that simply blending of elastomers and plastics is old in the art. This invention will demonstrate that blends of sulfonated elastomers with selected crystalline polyolefins can give rise to materials with superior properties. It will be shown that the mixing of nonsulfonated elastomers with crystalline polyolefins provides blends of unremarkable properties. Similarly blends of these sulfonated elastomers with plastics other than those taught herein, again provide systems of undesirable properties.

The desirable plastics employed in this invention have been characterized as crystalline polyolefins. It is believed that these materials are uniquely suited for this invention because they possess the requisite compatibility over a broad compositional range and thereby provide the desirable reinforcement which gives rise to good physical properties. Substantiation of this excellent compatibility is found in Table I below. It is apparent that blends of high molecular weight crystalline polyolefins with the sulfonated elastomer described herein give products of high tensile strength at plastic levels of 20 weight percent. It is also apparent that those systems of higher plastic levels (e.g., at 40 weight percent) show even higher tensile strength. This behavior is evidence of excellent compatibility at ambient temperature of the sulfonated elastomer and crystalline polyolefin. The data in Table I show that blends of the same sulfonated elastomer with polystyrene, sulfonated polystyrene, poly-t-butyl styrene, poly-(-caprolactone, butyl rubber and similar systems give rise to products having tensile strengths and/or elongations which are less than those for the crystalline polyolefin blends with the sulfonated elastomer. Furthermore, increasing the plastic level from 20 to 40 weight percent generally provides a further deterioration of the tensile properties. These data provide a dramatic confirmation of the unique and surprising suitability of the crystalline polyolefins in preparing the blends disclosed and claimed in this invention.

It should be noted that the lower molecular weight crystalline polyolefins (waxes) are not as effective in producing high strength blends as are the high molecular weight plastics. However, these materials are very effective in decreasing the melt viscosity of the ionic elastomers, and still provide a reasonable and acceptable property balance even at high loadings despite their extremely low molecular weight. Blends of said sulfonated elastomers with copolymers of styrene and butadiene, and in general any of the polymers not derived from crystalline polyolefins or crystalline copolymers thereof, yield either poor melt viscosity or inadequate room temperature physical properties, in the products prepaared from these blends.

The crystalline polyolefins suitable for this invention can vary greatly in molecular weight, from as low as 2,000 up to and exceeding 200,000. The preferred molecular weight range is from 20,000 to 150,000. If the molecular weight of the polyolefin is too low, the crystalline polyolefin is essentially a wax. Such waxes are very effective in lowering the melt viscosity of the blends; however, the physical properties of the blend are generally inferior to those blends obtained with higher molecular weight polyolefins. Nevertheless, such blends with waxes are a dramatic improvement over the unmodified ionic elastomer.

If the molecular weight of the polyolefin is extremely high, then the melt viscosity of the blend is also high which makes fabrication of such blends difficult. The resulting physical properties of those blends are excellent. This, an optimum balance of good physical properties and acceptable melt rheology is achieved with crystalline polyolefins whose molecular weights are in the broad ranges cited above.

If the molecular weights of these polyolefins becomes too low, then noncrystalline products, or oils result. The use of oils in such blends is not within the scope of this invention because the oil-ionic elastomer combination does not provide the proper physical properties in the final product. For similar reasons, blends of noncrystalline polyolefin polymers (e.g., ethylene propylene diene terpolymers) are also excluded.

It should be apparent to those skilled in the art that the blends of this invention (e.g., ionic elastomer plus crystalline polyolefins) can be combined with other fillers, extruder oils and similar materials employed in the art. Suitable fillers include carbon blacks, mineral fillers, such as silica, zinc oxide, magnesium carbonate, calcium carbonate, magnesium silicate, clays. Oils, which are suitable, are normally hydrocarbon based and often either aromatic, naphthenic, or most preferably, paraffinic in nature. Those oils, known as rubber process oils, are especially preferred since they show good compatibility with the ionic elastomer of this invention and are of low cost.

While we have generally described binary blends in this invention of sulfonated elastomers and crystalline polyolefins, it should be readily apparent that ternary blends are also included. For example, the combination of sulfonated ethylene propylene diene terpolymer with 40 parts polypropylene and 20 parts of a crystalline wax per 100 parts of elastomer is a very desirable system blend.

The instant invention requires the blending of a suitable crystalline polyolefin with a sulfonated elastomer. It is important to observe that the resulting blend has vastly improved processability over the sulfonated elastomer sufficient to permit injection molding or rapid extrusion. It is believed that the improved flow characteristics for the blend are achieved as a result of decreased ionic association at elevated temperature, above the melting point of the crystalline polyolefin. Thus, the ionic elastomer must be of a molecular weight and possess a metal sulfonate content such that the ionic associations are dissipated as temperature is increased. If the metal sulfonate content is high (e.g., greater than 5.0 mole percent) then the metal cation employed should be of the type that weak ionic associations are achieved; such as zinc or an amine. It should be noted that the organic amines, which are useful as neutralizing agents in the instant invention, are those described at lines 1 to 11 of column 11 of U.S. Pat. No. 3,642,728. Alternatively, the strength of the ionic associations can be reduced by the addition of selected polar agents or preferential plasticizers.

These preferential plasticizers are described in U.S. Ser. No. 103,902, hereby incorporated by reference. The ionic elastomer, with or without the addition of these preferential plasticizers, must have a suitable degree of flow at elevated temperature in order to be useful in this invention. This flow behavior can be described quantitatively in terms of the shear stress at low shear rate under precisely defined conditions. Specifically, it is required that the ionic elastomer, in the absence of the crystalline polyolefin, have a shear stress measured at a shear rate of 0.74 $sec^{-1}$ of less than $1 \times 10^6$ $dynes/cm^2$ at 200°C. If the base gum employed has a shear stress value above this level, the ionic associations are too strong to be effectively dissipated at 200°C. to permit suitable flow even in the presence of the crystalline polyolefin. It is quite feasible to employ a metal sulfonate gum stock having a shear stress value above this level if a plasticizer is employed to reduce the shear stress to the required value. For example, a metal sulfonate level of 30 meq/100 gm based on an EPDM of 37 Mooney and fully neutralized with a zinc cation has a shear stress above that required for this invention. However, the addition of 3 equivalents of stearic acid to this gum reduces the viscosity such that the plasticized gum is within the specifications cited for this invention. Thus, the blending of 60 parts of polyethylene with 100 parts of such a plasticized gum provides a product of excellent flow behavior, and excellent physical properties.

It is readily apparent that blends of several crystalline polyolefins can be employed in this invention. For example, a combination of low density polyethylene and polypropylene with the sulfonate gum provide materials with improved properties for certain applications. Alternatively, blends of EPDM and other elastomers with the sulfonated gum can be employed to reduce the shear stress to the value of $1 \times 10^6$ $dynes/cm^2$. Similarly, the addition of rubber process oils and similar agents can be employed in combination with a crystalline polyolefin.

It is apparent that the blends of crystalline polyolefins with sulfonated elastomers can also contain other agents. For example, ternary or higher blends of crystalline polyolefin, sulfonated elastomer with other polymers, such as polyvinylchloride, polystyrene, ABS, polycarbonates, phenolic resin, nylon 6, nylon 6,6 and similar plastics or elastomers can be employed provided that said additives are minor proportions of the overall blend and provided that the crystalline polyolefin and sulfonated elastomer are present in the critical proportions described above.

The application for the plastic ionomer blends of this invention are diverse. The blends have excellent injection molding and extrusion properties. For example, injection molded shoe soles may be prepared from the instant blends because of their excellent abrasion resistance and flex fatigue properties which are highly desired in such application. Injection molded parts for automotive applications may be prepared from the blends of this invention, e.g., automobile sight shields, flexible bumpers, grill parts, etc. It is readily apparent to those skilled in the art that the properties, such as rigidity, can be varied widely depending on the level of crystalline polyolefin incorporated in the ionic elastomer, thus fabrication of rigid or semiflexible articles from the instant blends is contemplated. Articles from the blends of the instant invention may also be prepared by extrusion techniques. For example, garden hose, having outstanding strength in combination with light weight is one application. The electrical properties of these materials also allow the use of the instant blends as insulation for wire. Insulation prepared from rubber or polyethylene often requires a curing or vulcanization step to obtain optimum properties. The blends of this invention have excellent physical properties, and excellent electrical properties without the need for any curing step. The fact that chemical curing is not required permits relatively high speed extrusion operations which are not feasible with those systems requiring a curing step.

Other fabrication processes for these materials include vacuum forming, flow molding, slit extrusion, profile extrusion and similar operations. The wide versatility, from a fabrication viewpoint, permits the use of these blends in film, containers such as bottles, oriented sheet, fibers, especially oriented monofilament, packaging, appliance housing, floor mats, carpet backing, toys, sporting goods such as swim fins, face masks, and similar applications.

The advantage of the instant compositions as compared to the disadvantages of the compositions which have been excluded from the scope of the instant invention are more particularly described hereinbelow.

EXPERIMENTAL PROCEDURE

The blends described below were prepared by incorporating the crystalline polyolefin or the polymer which has been described as outside the scope of the instant invention into the sulfonated elastomer at levels of 20 and 40 weight percent on a 4-inch electric mill. In general, the crystalline polyolefin or other nonionic polymer was put on the mill first at its approximate softening or melting point, the temperature was adjusted until a melt band was achieved and the sulfonate was added. This mix was blended at this temperature until a uniform blend was achieved. This generally required from 3 to 20 minutes, depending on the system. The mix was then molded into 2 × 2 inch micro pads in a press which was preheated at 350°F. for 2 minutes and the sample pressed for 8 minutes at the same temperature and 20 tons pressure. The mold was cooled while maintaining the pressure before the sample pads were removed. Three micro dumbbells were cut from each sample and the room temperature stress-strain obtained on an Instron at a crosshead speed of 2 inches per minute. The stress-strain data were also obtained on selected samples at 100°C. using a heated chamber maintained at 100°C. and a crosshead speed of 2 inches per minute. Three micro dumbbells of each sample to be measured were placed on the floor of the heated chamber and allowed to temperature equilibrate for 5 minutes. The chamber was opened, a dumbbell inserted into the jaws, the chamber closed and after 1 minute the crosshead placed in motion and the stress-strain obtained. Elongations at 100°C. were taken from the recorder scan and therefore these values are not true elongation measurements and are reported for comparison of samples only.

Example I

The sulfonated elastomer used in this series of experiments was derived from an ethylene-propylene ethylidene norbornene (ENB) terpolymer (about 50% ethylene, 45% propylene, 5% ENB), said polymer having a Mooney viscosity at 260°F. of about 37, which was sulfonated to about 0.6 mole percent sulfonic acid and then neutralized with 2 equivalents of zinc stearate per equivalent sulfonic acid to insure complete neutralization of sulfonic acid groups.

I - 1 Low density polyethylene having a density of about 0.919 was employed as the crystalline thermoplastic. This crystalline plastic has a percent crystallinity of approximately 47% ± 5%.

(40%) 0.4 parts of plastic were placed on the mill at about 110°C. A clear molten band was readily formed. Then over a period of several minutes 0.6 parts of sulfonated ethylene-propylene ethylidene norbornene (zinc stearate full neutralized, 0.6 mole percent sulfonate) was added. The sulfonate polymer blended in rapidly at 110°–120°C. to form a clear, somewhat yellow band.

(20%) 0.2 parts of plastic were banded on the mill at 110°C. and 0.8 parts of sulfonate elastomer (same sample as above) blended as above. Again a clear, somewhat yellow band was formed at temperatures of 110°–125°C.

I - 2 High density polyethylene with a density of about 0.960 and a melt index of about 5.0 was employed. The level of crystallinity of this polymer was about 90% ± 5%. The procedure followed was similar to that above in I - 1 except the mill temperature was about 130°–150°C.

(40%) 0.4 parts of plastic were banded at 130°C. The sulfonated elastomer was added (0.6 parts) rapidly and formed a clear yellow band.

(20%) Same as above except 0.2 parts plastic and 0.8 parts sulfonated elastomer were employed.

I - 3 Polypropylene with a density of about 0.903 gms/cc and a melt index of about 5.4 was the plastic employed. It was estimated that the level of crystallinity in this plastic was about 65 ± 10%.

(40%) The plastic was banded at a temperature of 155°–165°C. About 0.4 parts of plastic was added, followed by 0.6 parts of the sulfonated elastomer employed above. A clear yellow band was formed. When cooled, a stiff translucent medium brown blend was achieved.

(20%) The same procedure was employed except 0.2 parts of plastic and 0.8 parts of sulfonated elastomer were combined. Again, a clear melt band was achieved.

I - 4 A partially crystalline copolymer of ethylene and propylene, having an ethylene content of about 90% was employed as the plastic. The level of crystallinity is estimated to be in the range of 35–40%.

(40%) The plastic (0.4 parts) was banded on the mill at 140°–155°C. and 0.6 parts of sulfonated elastomer added. A clear band was obtained.

(20%) The same procedure was followed except that 0.2 parts of plastic and 0.8 parts of sulfonated elastomer were employed.

In this milling experiment, as in those of I - 1, I - 2, I - 3, the elastomer plastic blends were readily mixed and formed clear bands on the mill — evidence that the blends were compatible.

I - 5 An ethylene-propylene-ethylidene norbornene terpolymer having a specific gravity of about 0.86, a Mooney viscosity of about 50 (at 260°F.), an ethylene content of 64% and a diene content of about 3.2% was employed. The level of crystallinity of this polymer was below 25%, and is estimated at about 15% or so. The melting point has been observed to be in the range of 40°–50°C.

(40%) 0.4 parts of this soft composition was banded on the mill at 55°–70°C. Then 0.6 parts of sulfonated elastomer were added and the mix was worked with some difficulty. After considerable effort, a reasonably homogeneous mix was achieved.

(20%) Same as above except 0.2 parts of the low crystallinity EPT and 0.8 parts of sulfonated elastomer were used. In both cases, a flexible rubbery translucent blend was obtained. The materials were noticeably more flexible than in the previous examples.

I - 6 A substantially noncrystalline butyl rubber which was a copolymer of isobutylene with 1.5 mole percent isoprene having a Mooney viscosity of about 55 (260°F.) was employed.

(40%) The butyl rubber (0.4 parts) was banded on the mill at room temperature and the sulfonated elastomer added. The blend was rapidly homogenized to a rubbery blend.

(20%) The same procedure as above was followed, except only 0.2 parts of butyl rubber and 0.8 parts of sulfonated elastomer were employed. In both cases, rubbery blends of low stiffness, lower than the starting sulfonated elastomer, were achieved.

I - 7 A copolymer of ethylene and vinylacetate (EVA) having 33 weight percent vinylacetate and a melt index of about 25 was employed as the minor component. This copolymer is essentially noncrystalline and therefore clearly has a crystallinity level less than 25%.

(40%) The EVA (0.4 parts) was banded on the mill at about 50°C. showing that it has a very low melting point. Then 0.6 parts of sulfonated elastomer were blended in to form a nearly clear band.

(20%) The same procedure as above was followed except 0.2 parts of EVA and 0.8 parts of sulfonated elastomer were used. In both cases, a rubbery product was achieved.

I - 8 A homopolymer of ε-caprolactone (poly ε-caprolactone) having a number average molecular weight of about 40,000 and a crystalline melting point of about 60°C. was employed as the plastic additive. The level of crystallinity was estimated to be about 60%.

(40%) The poly ε-caprolactone was observed to form a clear melt when banded on the mill at 60°C. To about 0.4 parts of the plastic in molten form, about 0.6 parts of sulfonate elastomer (same sample as above) was added slowly. The milling was effected at about 65°C.

(20%) About 0.2 parts of the plastic was employed and about 0.8 parts of the elastomer in the same manner as above.

I - 9 The plastic additive in this case was a microcrystalline wax (MC wax) with a melting point of about 70° to 90°C. The level of crystallinity in such waxes is estimated to be about 40% ± 10%.

(40%) In the case of low melting waxes, the sulfonated elastomer sample employed above was first banded on the mill at 70°C. The wax was added slowly over about ½ hour. An apparently homogeneous blend was formed which cools to a cloudy somewhat stiffer product. In this case, about 0.4 parts of wax and 0.6 parts of sulfonated elastomer was employed.

(20%) The same procedure was employed except 0.2 parts wax and 0.8 parts of sulfonated elastomer were combined.

I - 10 A homopolymer, polystyrene, which was noncrystalline and which had a number average molecular weight estimated to be 180,000 was employed as the plastic.

(40%) The polystyrene was blended on the mill at 130°C. To 0.4 parts of polystyrene, 0.6 parts of sulfonated elastomer was added which formed a milky tan melt. The mixing was effected at 130°C.

(20%) The same procedure as above was employed except 0.2 parts of plastic and 0.8 parts sulfonated elastomer were blended.

In both cases, the mixture when molten appeared cloudy, indicating a lack of compatibility in the melt between the polystyrene and sulfonated elastomer.

I - 11 A commercial sample of ABS plastic was employed as the plastic additive. This plastic was a combination of styrene/acrylonitrile plastic believed to be a graft and blend on acrylonitrile/butadiene rubber. As such, it was amorphous and not within the scope of this invention, but it was examined to determine how such compositions compare with those described herein.

(40%) The Tybrene ABS plastic was banded on the mill at 130°C. (0.4 parts). 0.6 parts of sulfonated elastomer was blended to form an opaque molten blend.

(20%) The same procedure was followed except 0.2 parts of ABS and 0.8 parts sulfonated elastomer were employed.

These experiments are a further demonstration that polymers other than polyolefins behave differently in their compatibility with the sulfonated elastomers from the desired crystalline polyolefins described herein.

I - 12 A lightly sulfonated polystyrene, said polystyrene having a number average molecular weight of about 180,000, and a metal sulfonate content of 2.56 mole percent with sodium as the cation was employed as the plastic. This polymer was noncrystalline.

(40%) The plastic (0.4 parts) was banded on the mill at 160°C. to form a white band. The sulfonated elastomer (0.6 parts) was blended slowly at 165°C. to 170°C. After about ½ hour an olive brown opaque mixture was achieved. It cooled to a stiff, boardy brown opaque blend.

(20%) 0.2 parts of the plastic was combined with 0.8 parts of sulfonated elastomer as above with similar results.

These results again demonstrate that polymers other than polyolefins are not effective in forming homogeneous melts with sulfonated elastomers even when said polymers are plastics containing metal sulfonate groups.

I - 13 A homopolymer of p-t-butyl styrene having a degree of polymerization of about 1,500 (a molecular weight of about 240,000) was employed as the plastic additive. This polymer was noncrystalline but was employed because it was a vinyl aromatic polymer with a large hydrocarbon pendant group. Thus, it was ideally suited to test whether such a pendant group would make the polymer more compatible in this experiment.

(40%) 0.4 parts of poly-t-butyl styrene was banded on the mill at 175°C. 0.6 parts of sulfonated elastomer was blended slowly to form an opaque band. When cooled, the blend was a dark brown, opaque blend.

(20%) 0.2 parts of poly-t-butyl styrene was blended with 0.8 parts of sulfonated elastomer in the same manner and with similar results.

I - 14 A three block copolymer polystyrene (25 weight percent)-poly t-butyl styrene (50 weight percent)-polystyrene (25 weight percent) was employed as the plastic. This plastic is noncrystalline and also is a rigid plastic.

(40%) 0.4 parts of the plastic was banded on the mill at 155°C. 0.6 parts of sulfonated elastomer was blended at the same temperature.

(20%) 0.2 parts of the plastic and 0.8 parts of sulfonated elastomer were blended as above.

The milling behavior of these 14 different agents with a common sulfonated elastomer clearly demonstrates that crystalline polyolefins in general can be readily blended with the sulfonated elastomers described in this invention with little difficulty. Such blends tend to be homogeneous in the melt demonstrating an unusual degree of compatibility. However, the use of other polymers, such as polyvinyl aromatics, polylactones, sulfonated polyvinyl aromatics, and olefin copolymers with sufficient polar comonomer to render them amorphous tend to be less compatible such that molten blends with sulfonated elastomer tend to be cloudy or opaque, thus demonstrating incompatibility in the melt. This latter characteristic is very undesirable in preparing blends of different polymers for it suggests that phase separation with consequent changes in properties will result with such systems.

The physical properties of the blends of the above examples are shown in Table I.

Table I

| Sample No. | Blend | % | Room Temp. Stress-Strain | | | | 100°C. Stress-Strain | | | |
|---|---|---|---|---|---|---|---|---|---|---|
| | | | 100% Mod. | Tensile | Elong. | Perm Set | Yield | Tensile | Elong. | Perm. Set |
| | Sulfonate Control | — | 210 | 1194 | 585 | 5 | 85 | 86 | 1650 + (No Break) | 229 |
| I - 1 | Low Density Polyethylene | 20 | 315 | 2083 | 637 | 67 | 113 | 81 | 770 | 135 |
| | | 40 | 520 | 2388 | 620 | 181 | 172 | 178 | 510 | 72 |
| I - 2 | High Density Polyethylene | 20 | 381 | 2111 | 608 | 34 | 124 | 75 | 1280 | 251 |
| | | 40 | 844 | 2454 | 605 | 182 | 262 | 150 | 733 | 210 |
| I - 3 | Polypropylene | 20 | 1235 | 1252 | 140 | 5 | — | 367 | 150 | 0 |
| | | 40 | — | 2263 | 57 | 5 | — | 783 | 115 | 0 |
| I - 4 | EP Rubber | 20 | 290 | 2418 | 630 | 50 | 75 | 56 | 1150 | 181 |
| | | 40 | 389 | 3675 | 660 | 117 | 63 | 42 | 620 | 95 |
| I - 5 | EPDM | 20 | 206 | 882 | 593 | 12 | 54 | 47 | 1000 | 161 |
| | | 40 | 197 | 684 | 650 | 36 | 30 | 18 | 1250 | 265 |
| I - 6 | Butyl | 20 | 159 | 841 | 580 | 4 | | | | |

Table I-continued

| Sample No. | Blend | % | Room Temp. Stress-Strain | | | | Yield | 100°C. Stress-Strain | | |
|---|---|---|---|---|---|---|---|---|---|---|
| | | | 100% Mod. | Tensile | Elong. | Perm Set | | Tensile | Elong. | Perm. Set |
| | | 40 | 121 | 578 | 590 | 8 | | | | |
| I - 7 | EVA | 20 | 240 | 993 | 583 | 13 | .70 | 71 | 1010 | 109 |
| | | 40 | 247 | 798 | 587 | 31 | — | 49 | 590 | 43 |
| I - 8 | Poly-ε-  | 20 | 212 | 863 | 580 | 10 | 67 | 61 | 710 | 74 |
| | Caprolactone | 40 | 204 | 353 | 467 | 22 | — | 52 | 277 | 20 |
| I - 9 | MC Wax | 20 | 238 | 997 | 627 | 22 | | | | |
| | | 40 | 277 | 832 | 633 | 56 | | | | |
| I - 10 | Polystyrene | 20 | 273 | 1035 | 580 | 12 | | | | |
| | | 40 | 524 | 507 | 490 | 28 | | | | |
| I - 11 | Tybrene | 20 | 381 | 1077 | 557 | 10 | | | | |
| | ABS | 40 | — | 1238 | 60 | 9 | | | | |
| I - 12 | Sulfonated | 20 | 305 | 731 | 450 | 13 | | | | |
| | PS | 40 | 374 | 384 | 333 | 19 | | | | |
| I - 13 | Poly-t-Butyl | 20 | 319 | 1354 | 573 | 17 | | | | |
| | Styrene | 40 | 476 | 425 | 417 | 27 | | | | |
| I - 14 | 25 PS-50 PTBS- | 20 | 430 | 1274 | 587 | 25 | | | | |
| | 25 PS | 40 | 913 | 746 | 123 | 17 | | | | |

The data in Table I are very revealing and basic to the instant invention. It is apparent that those blends derived from crystalline polyolefins meeting the criteria of this invention generally display the following characteristics:

A. Possess tensile strengths at room tempeature comparable to or above those of the sulfonate gum control.
B. Possess moduli at 100% strain above that of the sulfonate gum control demonstrating that the plastic additive is acting to stiffen the sulfonated elastomers.
C. Show an increase in the 100% modulus as the amount of plastic additive is increased from 20 to 40% showing that the increased rigidity of the blends is dependent on the amount of plastic additive present.
D. Display compatibility in the melt during the blending operation.

Certain polymers examined in Table I clearly are not effective in increasing the modulus (such as I - 5, I - 6, I - 8). Others have a marked deleterious effect on the tensile strength at break (I - 7, I - 10, I - 12, I - 13, I - 14) especially when present at the 40% level.

Example II

Blends of crystalline polyolefins with nonsulfonated polymer of Example I. In this experiment the predecessor polymer, i.e. the unsulfonated ethylene-propylene terpolymer, was blended with the preferred crystalline polyolefins used to prepare the blends of the instant invention. These blends were tested in a similar manner to the blends described in Example I. The ethylene-propylene-ethylidene norbornene terpolymer, abbreviated EPDM, was based on an ethylene content of about 50%, a propylene content of about 45% and a diene content of about 5%, the elastomer having a Mooney viscosity at 260°F. of 37.

The same experimental procedure described in Example I was employed. The same crystalline polyolefins were employed at levels of 20 and 40%. In all cases, blends were readily formed which appeared nearly clear in the melt. The conditions for blending are shown below along with the experimental observations:

II - 1 Low Density Polyethylene (40%) Melt band at 110°C. The EPDM blends easily to an almost clear band, mixed at 110°–125°C. Cools to a milky white stiff rubbery blend.
(20%) Same. Cools to a milky white rubbery blend.

II - 2 High Density Polyethylene (40%) Melt band at 130°C. The EPDM blends easily to an almost clear band, mixed at 130°–140°C. Cools to a milky white, stiff rubbery blend with waxy feel.
(20%) Same. Cools to a milky white rubbery blend.

II - 3 Polypropylene (40%) Clear melt band at 165°C. The EPDM blends easily, temperature raised to 165°C., clear band. Cools to a milky white, stiff, boardy blend.
(20%) Same. Mix at 165°–170°C., clear band. Cools to a cloudy white, rubbery blend.

The samples of examples were molded and characterized as in Example I. The stress-strain properties are illustrated below in Table II.

Table II

| | Blend | % | Yield | Room Temp. Stress-Strain | | | |
|---|---|---|---|---|---|---|---|
| | | | | 100% Mod. | Tensile | Elong. | Perm. Set |
| | EPDM Control | — | 35 | 34 | 18.5 | No Break | 515 |
| II - 1 | Low Density Polyethylene | 20 | — | 158 | 343 | 1330 | 530 |
| | | 40 | — | 345 | 730 | 883 | 577 |
| II - 2 | High Density Polyethylene | 20 | 95 | 73 | 27 | 1310 | 348 |
| | | 40 | 251 | 190 | 155 | 230 | 90 |
| II - 3 | Polypropylene | 20 | 77 | 68 | 31 | 500 | 65 |
| | | 40 | — | — | 841 | 43 | 9 |

Note that when compared to the blends of the sulfonated derivatives, the following points may be observed:

1. The blends of crystalline polyolefins with the sulfonated elastomers generally provide material of high tensile strength and high elongations. Indeed, the tensile strengths of these blends are in many cases greatly superior to that achieved with the sulfonated elastomer alone.

2. The stiffness or modulus at 100% strain of the blends is substantially above that obtained for the sulfonated elastomer, indicative of the greater rigidity of the blend.

3. At elevated temperatures (100°C.), the tensile properties of the blends are often substantially above that of the sulfonated elastomer, demonstrating the higher use temperature of these blends.

4. Comparison of the blends of sulfonated elastomers with those blends derived from unsulfonated elastomers demonstrated that in the latter case the molded materials display low tensile properties. In addition, in those cases where high elongations are obtained, the permanent distortion upon elongation (defined as permanent set) is high. Thus, these blends have very poor recovery properties and are not the desired elastic systems of this invention.

Example III

Rheological characteristics of sulfonated ethylene-propylene terpolymer, described in Example I, alone, and blended with the crystalline polyolefins of the instant invention were tested for melt viscosity. These measurements were made at varying shear rates as reported below. Note that it is apparent that the addition of the crystalline polyolefin significantly reduces the apparent viscosity, especially at low shear rates. It is clear also that at high shear rates a reduction in the apparent viscosity decrease is maintained. The importance of these changes in flow behavior is demonstrated dramatically when attempts are made to fabricate these respective materials. The blends of this invention have much improved processability, such that they can be compression molded and extruded under appropriate conditions, and yet retain excellent physical properties at ambient conditions. The results are reported in Table III below.

An ethylene-propylene-ethylidene norbornene terpolymer (about 50 weight percent ethylene, about 45 weight percent propylene, about 5 weight percent ethylidene norbornene (ENB) with a Mooney viscosity value of about 37) was sulfonated to a level of 30 milliequivalents of sulfonic acid per 100 grams of polymer using acetyl sulfate as the sulfonation agent. The sulfonic acid polymer was isolated from the hydrocarbon solution by steam stripping. An off-white crumb was obtained. To eliminate most of the water, the above crumb was dried on a heated two roll mill at temperatures below 200°F. to avoid decomposition of the polymer. When dried under these mild conditions an off-color gum containing a low (about 5%) amount of water was obtained. This gum was then neutralized on a cool mill with three equivalents of zinc stearate. The neutralized sulfonate gum was then reacted with a low level of magnesium hydroxide, again on a cool mill, a process which substantially neutralizes the stearic acid which was liberated during the zinc stearate neutralization. This gum was now compounded with 30% density polyethylene (a commercial polyethylene having a density of 0.96 and a melt index of 6.0), by fluxing the plastic on a heated two roll mill at about 150°C. and then adding the neutralized gum to the plastic melt. After 2 to 5 minutes of blending on the mill a homogeneous product was achieved. At this stage in the process, the composition of the blend was comprised of the following based on the sulfonic acid gum:

| | Parts |
|---|---|
| Sulfonic Acid Gum of EPT | 100 |
| Zinc Stearate | 28.5 |
| High Density Polyethylene | 56.2 |
| Magnesium Hydroxide | 2.7 |

The milled sheet was taken off the hot mill, cooled, cut into strips, and extruded in a ¾ inch extruder to

Table III

Rheological Characteristics of Sulfo-EP and Polyolefin Blends
Apparent Viscosity, poise × 10⁻³⁽¹⁾

| Shear Rate[1] sec⁻¹ | Sulfo-EP Base | Sulfo-EP +20% PP[2] | Sulfo-EP +40% PP | Sulfo-EP +20% HDPE[2] | Sulfo-EP +40% HDPE | Sulfo-EP +20% LDPE[2] | Sulfo-EP +40% LDPE |
|---|---|---|---|---|---|---|---|
| 0.29 | 960 | 400 | 210 | 370 | 290 | 500 | 320 |
| 0.73 | 680 | 300 | 150 | 310 | 180 | 380 | 220 |
| 1.47 | 480 | 230 | 130 | 240 | 130 | 300 | 180 |
| 2.94 | 350 | 180 | 96 | 180 | 98 | 220 | 130 |
| 7.35 | 210 | 100 | 61 | 120 | 66 | 140 | 87 |
| 14.69 | 140 | 68 | 40 | 79 | 46 | 91 | 59 |
| 29.39 | 88 | 42 | 26 | 52 | 32 | 59 | 39 |
| 73.47 | 47 | 23 | 14 | 29 | 19 | 32 | 22 |
| 146.9 | 28 | 14 | 8.9 | 18 | 13 | 20 | 14 |
| 293.9 | 16 | 8.6 | 5.6 | 11 | 8.4 | 12 | 8.7 |
| 734.7 | 8.8 | 4.2 | 3.0 | 5.8 | 4.6 | 6.1 | 4.6 |
| 1469 | — | 2.4 | 1.8 | 2.8 | 2.6 | 3.5 | 2.7 |

[1]Uncorrected Data, Instron Capillary Rheometer, 0.05034" × 1.0074" Die, 90° entry angle, 200°C.
[2]PP = Polypropylene
HDPE = High Density Polyethylene
LDPE = Low Density Polyethylene

Example IV

This example demonstrates how the blends of this invention compare in physcial properties and flow behavior with an ionic elastomer which does not contain a plastic additive, but is compounded with conventional ingredients such as carbon black and rubber process oil. It will be shown that selected valuable and unexpected properties are achieved with the plastic blends of this invention.

A. Preparation of a Plastic Blend of a Sulfonate Elastomer form a rod ⅛ inch in diameter at 170°C., water cooled and pelletized. This material was now ready to be compression molded, injection molded or extruded.

B. Preparation of a Carbon Black, Oil Blend of a Sulfonate Elastomer

An ethylene-propylene-ethylidene norbornene terpolymer was sulfonated, isolated, and dried in a manner similar to that described in (A). The same base polymer was employed and the sulfonation was conducted to give a sulfonic acid polymer again possessing about 30 milliequivalents of sulfonic acid per 100 grams of polymer. This dried sulfonic acid gum was then compounded with 150 parts of carbon black, 100 parts of rubber process oil and two equivalents of magnesium stearate. This mixing operation was conducted on a cool mill, although the shearing action on the polymer generated some heat, especially with the addition of the magnesium stearate. The milled sheet was removed from the mill. At this time the sheet was compression molded at elevated temperatures (about 325°F. for 45 minutes), cooled, cut into strips, and these strips were diced into free flowing pellets. At this stage, the compounded sulfonate elastomer was suitable for compression molding, injection molding, or extrusion.

C. The Physical Properties of Plastic Blends and Carbon Black, Oil Formulations

The following table summarizes physical properties measured on the plastic blend, and the oil, carbon black formulations described above. The measurements were performed on samples obtained by compression molding of the appropriate samples. Generally, these compression moldings were conducted at a temperature of 350°F. (preheat about three minutes, molding time about 5 minutes, and then cooled under pressure).

These results vividly demonstrate that metal sulfonate-containing elastomers can be blended with minor amounts of crystalline polyolefins to yield a blend with a much superior property-rheology balance than can be achieved employing conventional elastomer formulation. In addition, selected physical properties from such plastic blends are equal or superior to that obtained from a number of commercial thermoplastic elastomers.

Example V

Preparation of a Polypropylene-Sulfonate Elastomer Plastic Blend

An ethylene-propylene-ethylidene norbornene terpolymer (about 50 weight percent ethylene, about 45 weight percent propylene, about 5 weight percent ethylidene norbornene (ENB) with a Mooney viscosity of about 20) was sulfonated in heptane solution to a level of 30 milliequivalents of sulfonic acid per 100 grams of polymer using the following procedure: Acetic anhydride was added to the room temperature solution. After 5 minutes, concentrated $H_2SO_4$ was dropped in over a 10 minute period, and the mixture stirred for 30 minutes. Reaction was quenched by the addition of Table IV

| Property | Properties of a Plastic Blend and Carbon Black, Oil Extended Sulfonate Elastomer | |
|---|---|---|
| | High Density Polyethylene Blend (A) | Carbon Black, Oil Formulation (B) |
| Shore A Hardness initial/after 10 seconds | 94/92 | 69/64 |
| Tensile Strength at Break, psi | 2270 | 1275 |
| Elongation at Break, % | 560 | 348 |
| Tear Strength (lb/in) | 390 | 212 |
| Flex Fatigue (cycles) | 234,188 | 6070 |
| Taber Abrasion, Weight Loss in mg/1000 cycles | 18.3 | 211.3 |
| Flammability - Horizontal Burning Rate (in/min) | 0.60 | 1.423 |
| Brittle Point | <−100 | −89 |
| Resilience (%) | 60.2 | 50.4 |

It is readily apparent from the table that the plastic blend of the sulfonated elastomer manifests marked and unexpected improvement in selected important physical properties as compared to the carbon black, oil extended formulation. In particular, the tensile strength at break is substantially higher for the plastic blend. However, two physical properties are even more dramatically improved. These are flex fatigue and Taber abrasion. In this respect, the plastic blend is superior to the other formulation.

A comparison of the flow behavior of the above compositions, when conducted at the same temperature (200°C.) shows that the plastic blend has a slightly lower viscosity at low shear rate. Therefore, this dramatic improvement in physical properties is obtained with no sacrifice in flow behavior. Indeed, injection molding trials were conducted with both materials on a small commercial injection molder. It was observed that both materials could be injection molded. However, the carbon black, oil extended composition required more closely controlled processing conditions and a mold which was heated to a relatively high temperature of 180°0 to 220°F. In contrast, the plastic blend was observed to process with greater latitude in conditions and could be employed with a much cooler mold; under certain conditions a mold temperature of 100° to 150°F. could be employed.

isopropanol. Then stearic acid (32 g/$SO_3H$) was added and the mixture stirred until stearic acid dissolved. This was followed by the addition of an aqueous solution of zinc acetate (32 g/$SO_3H$) and Antioxidant-2246, stirred for 15 minutes and then steam stripped. The steam stripped mass was broken up with water in a Waring blender, and the crumb filtered.

Water was then removed by milling at 300°F. for 8 minutes. The sulfonated gum was then blended in a Brabender mixing head (170°C., 50 rpm for 4 minutes) with 35% polypropylene (a commercial polypropylene having a melt index of 5.0), ZnO-Mg(OH)$_2$ mixture added and milled for 4 minutes. This was followed by 3 ½ minutes of milling at 160°C. on a 3-inch mill. The composition of the blend was comprised of the following based on the zinc acetate-stearic acid neutralized gum:

| | Parts |
|---|---|
| Gum | 100 |
| Polypropylene | 53.8 |
| Zinc Oxide | 25 |
| Magnesium Hydroxide | 2.03 |

Compression molded pads (preheated mold, 3 minutes preheat, 4 minutes pressure at 350°F., 20 tons gauge pressure, cooled under 20 tons) were prepared for stress-strain determinations (room temperature and 100°C., Instron, 2 inches/minute crosshead speed) and rheology (200°C., 0.05 inch × 1 inch diameter, Instron, capillary rheometer)

| Stress-Strain Property | Room Temp. | 100°C. |
|---|---|---|
| 100% Modulus, psi | 1557 | 328 |
| Tensile Strength at Break, psi | 2627 | 372 |
| Elongation at Break, % | 410 | 580 |

The physical properties are seen to be excellent with high tensile strength at break and good elongations. These results show that with polypropylene, good intimate mixing of plastic and sulfonated elastomer are required to obtain good blends rather than the poorer ones described in Example I - 3. The resulting material was readily compression molded at temperatures of 350°–400°F. Rheological studies indicated that the blend should be readily extruded at similar temperatures.

What we claim is:

1. A composition of matter which comprises a blend of a sulfonated elastomer and a crystalline polyolefin wherein said sulfonated elastomer consists essentially of sulfonated nonaromatic hydrocarbon polymers and said sulfonated elastomer comprises a continuous phase of said blend, and a crystalline polyolefin, said sulfonated elastomer comprising from about 0.2 to about 20 mole percent sulfonate groups, at least 95% of which are combined with metal counter ions selected from the group consisting of Groups I and II of the Periodic Table of the Elements, aluminum, and lead; organic amines; and mixtures thereof, said sulfonated elastomer being further characterized as having a shear stress as measured at a shear rate of 0.74 sec$^{-1}$, of less than $1 \times 10^6$ dynes/cm$^2$ at 200°C, and said crystalline polyolefin is characterized as having a degree of crystallinity of at least 25%, said blend further characterized as having a weight ratio of crystalline polyolefin to the sulfonated elastomer of from less than 1.0 to 0.05.

2. The composition of claim 1 wherein said polyolefin is selected from the group consisting of polyethylene and polypropylene.

3. the composition of claim 1 wherein said sulfonated elastomer is selected from the group consisting of sulfonated ethylene-propylene terpolymers and sulfonated butyl polymers.

4. The composition of claim 1 wherein said polyolefin has a crystalline melting point of at least 70°C.

5. The composition of claim 1 wherein said polyolefin has a degree of crystallinity of at least 40%.

6. The composition of claim 1 wherein said polyolefin has a molecular weight of from 20,000 to 150,000.

7. The composition of claim 1 wherein the weight ratio of crystalline polyolefin to the sulfonated elastomer is less than 0.70.

8. The composition of claim 1 wherein at least 98% of the sulfonate groups are combined with metal counter ions selected from the group consisting of Groups I and II of the Periodic Table of the Elements, aluminum, and lead; organic amines; and mixtures thereof.

9. The composition of claim 8, further limited to the metal counter ions described therein.

10. The composition of claim 9 wherein said sulfonated elastomer is a sulfonated ethylene-propylene terpolymer and said crystalline polyolefin is polyethylene.

* * * * *